United States Patent [19]
Mochizuki et al.

[11] Patent Number: 5,701,190
[45] Date of Patent: Dec. 23, 1997

[54] LASER SCANNER AND SCANNING LENS

[75] Inventors: Takeshi Mochizuki; Susumu Saito, both of Ibaraki, Japan

[73] Assignee: Hitachi Koki Co., Ltd., Tokyo, Japan

[21] Appl. No.: 538,766

[22] Filed: Oct. 5, 1995

Related U.S. Application Data

[63] Continuation of Ser. No. 191,932, Feb. 4, 1994, abandoned.

[30] Foreign Application Priority Data

Feb. 5, 1993 [JP] Japan ..................... 5-18948

[51] Int. Cl.$^6$ ................................. G02B 26/08
[52] U.S. Cl. ................. 359/205; 359/206; 359/207; 359/216
[58] Field of Search ................. 359/205–207, 359/212–219, 708, 710, 716–717, 784–785, 789–794, 662; 250/234–236; 346/108; 358/494; 347/258–261

[56] References Cited

U.S. PATENT DOCUMENTS

| | | | |
|---|---|---|---|
| 4,561,717 | 12/1985 | Kataoka et al. | 359/217 |
| 4,882,483 | 11/1989 | Mochizuki et al. | 250/236 |
| 5,025,268 | 6/1991 | Arimoto et al. | 359/205 |
| 5,052,767 | 10/1991 | Sugata et al. | 359/206 |
| 5,245,462 | 9/1993 | Kanai et al. | 359/204 |
| 5,270,850 | 12/1993 | Mochizuki et al. | 359/206 |

FOREIGN PATENT DOCUMENTS

| | | |
|---|---|---|
| 50-93720 | 7/1975 | Japan . |
| 57-35825 | 2/1982 | Japan . |
| 62-265615 | 11/1987 | Japan . |

*Primary Examiner*—James Phan
*Attorney, Agent, or Firm*—Sughrue,Mion,Zinn,Macpeak & Seas, PLLC

[57] ABSTRACT

Rays of light from a laser light source are permitted to form a line image at a reflecting face of a rotating polygonal mirror via a line image forming optical member and the rays of reflected light from the reflecting face are focused by a scanning lens system to scan over the surface to be scanned. The scanning lens system comprises a cylindrical lens having a positive power that is located in the nearest position to the surface to be scanned and an aspheric lens at least one surface of which has such a profile that the radius of its curvature in a direction normal to the scan direction increases from the central portion to either end portion.

1 Claim, 5 Drawing Sheets

LASER SCANNER AND SCANNING LENS

This is a continuation of application No. 08/191,932 filed Feb. 4, 1994, now abandoned.

BACKGROUND OF THE INVENTION

1. Field of the Invention

This invention relates to a laser scanner and a scanning lens system that is to be used therewith. More particularly, this invention relates to a laser scanner suitable for use on a laser printer system for high-resolution printing. The invention also relates to a scanning lens system that is to be used with such laser scanner.

2. Discussion of the Related Art

Conventional laser printer systems use the combination of a scanning lens system and a rotating polygonal mirror which serves as a light deflector. The polygonal mirror deflects a laser beam so that it scans over the surface of a photoreceptor drum.

The demand for producing images of higher resolution on laser printer systems is ever growing today. To meet this demand for higher image resolution, it is absolutely necessary that a small spot of stable laser beam be produced over the whole scanning area.

While several ideas have been proposed to satisfy this need, one proposal is to use a plurality of spherical lenses and an elongated cylindrical lens in constructing a scanning lens system for use with a laser scanner that is suitable for use on a laser printer system. A problem with this idea is that it has not taken into account the curvature of an image surface in a direction normal to the scan direction in response to the change that occurs in the angle of incidence of a laser beam on the elongated cylindrical lens depending upon the position of its deflection. A technique related to this idea is described in Unexamined Published Japanese Patent Application (kokai) No. Sho 50-93720.

Another idea to improve the scanning lens system for use with a laser scanner that is suitable for use on a laser printer system is to use a toric lens. This proposal is noteworthy in that it contributes to a smaller size of the laser printer system and, in addition, the curvature of an image surface in a direction normal to the scan direction can be made smaller than in the case of using an elongated cylindrical lens. However, this advantage of reducing the field curvature in a direction normal to the scan direction has been limited since the toric lens has a fixed radius of curvature in a direction normal to the scan direction. A technique related to this idea is described in Unexamined Published japanese Patent Application (kokai) No. Sho 57-35825.

Yet another idea on the improvement of the scanning lens system for use with laser scanner that is suitable for use on a laser printer system is to reduce the field curvature in a direction normal to the scan direction to a minimum level by using a lens that contains an aspheric surface of rotational asymmetry which has the radius of its curvature in a direction normal to the scan direction varied with the position of laser beam deflection. However, this proposal suffers from the disadvantage that the lens it uses is of such a shape that the radius of curvature in a direction normal to the scan direction varies continuously and that, therefore, the lens is more prone to working errors than the above-described toric lens which has a fixed radius of curvature. Further, the proposal at issue has not taken into consideration the curvature of an image surface in a direction normal to the scan direction on account of the working errors that occur in the radius of curvature.

A technique related to this idea is described in Unexamined Published Japanese Patent Application (kokai) No. Sho 62-265615.

The above-described conventional leaser scanners that are suitable for use-on laser printer systems have had the problem that if curvature of the image surface develops on account of the scanning lens, the spot diameter of the laser beam focused on the surface to be scanned increases to such an extent that no small spot of stable laser beam can be produced over the whole scan range. This problem of increased spot diameter of laser beam will inevitably lower the quality of prints that are produced by the laser printer system for high-resolution printing.

SUMMARY OF THE INVENTION

The present invention has been accomplished under these circumstances and has as an object providing a laser scanner suitable for use on a laser printer system that will develop less curvature of the image surface on account of the scanning lens it uses and which forms a small spot of stable laser beam over the entire scan range, thereby enabling high-resolution printing.

Another object of the present invention is to provide a scanning lens system that is to be used with this laser scanner.

The first object of the present invention can be attained by a laser scanner for use on a laser printer system that permits rays of light from a laser light source to form a line image at a reflecting face of a light deflector via a line image forming optical member, the rays of reflected light from said reflecting face being focused by a scanning lens system to scan over the surface to be scanned, said scanning lens system comprising a cylindrical lens having a positive power that is located in the nearest position to the surface to be scanned and an aspheric lens, at least one surface of which has such a profile that the radius of its curvature in a direction normal to the scan direction increases from the central portion to either end portion.

The second object of the present invention can be attained by a scanning lens system for use in a laser scanner to scan over the surface to be scanned by focused rays of light that have been deflected by a light deflector, said scanning lens system comprising a cylindrical lens having a positive power that is located in the nearest position to the surface to be scanned and an aspheric lens, at least one surface of which has such a profile that the radius of its curvature in a direction normal to the scan direction increases from the central portion to either end portion.

In accordance with the present invention, the radius of curvature of the aspheric lens varies with the position of light deflection in such a way that it will be zero including the curvature of field that is developed by the cylindrical lens; hence, in the absence of errors in the radius of curvature, there will be no curvature of the field or image surface. If the radius of curvature of the aspheric lens contains errors, the image surface will be curved. However, the scanning lens system of the present invention comprises at least the cylindrical lens and the lens containing an aspheric surface of rotational asymmetry that has the radius of its curvature in a direction normal to the scan direction varied with the position of light deflection, and by using this lens system, one can reduce the curvature of field that develops on the account of errors in the radius of curvature of the aspheric lens in a direction normal to the scan direction.

BRIEF DESCRIPTION OF THE DRAWINGS

The above and other objects and features of the present invention will be more apparent from the following description taken in conjunction with the accompanying drawings.

DETAILED DESCRIPTION OF THE INVENTION

Figure 1:
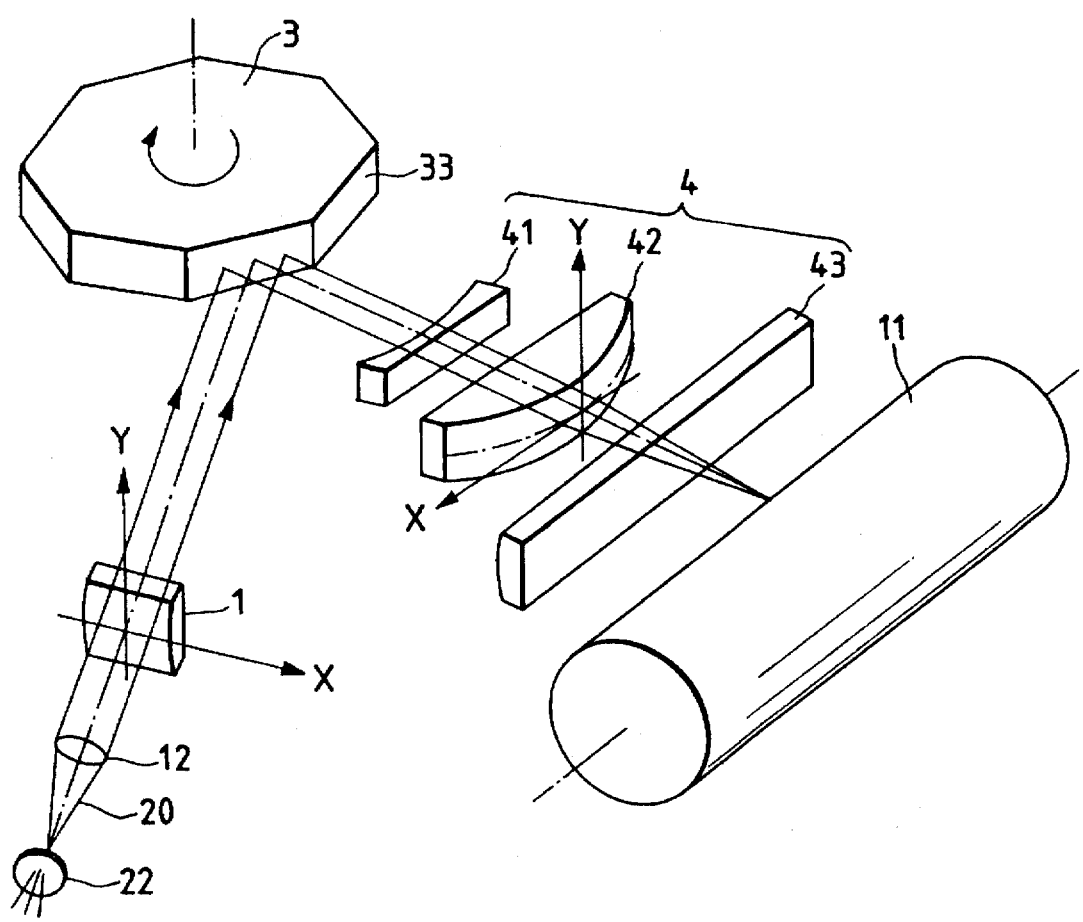
FIG. 1 is a diagram showing the basic layout of a laser scanner according to an embodiment of the first aspect of the present invention.

Referring to FIG. 1, numeral 1 denotes a line image forming optical member; 3 is a rotating polygonal mirror serving as a light deflector; 4 is a scanning lens system; 11 is the surface of a photoreceptor drum to be scanned (which is hereunder referred to simply as "the surface to be scanned"); 12 is a collimator lens; 20 is a scan beam; 22 is a laser light source; 33 is a reflecting face of the rotating polygonal mirror 3; 42 is an aspheric lens of rotational asymmetry that has the radius of curvature in a direction normal to the scan direction varied with the position of beam deflection; and 43 is a lens that is composed of a cylindrical surface and a plane surface. These components combine together to make up a laser scanner.

As shown in FIG. 1, the scan beams emitted from the laser light source 22 are collimated by passage through the lens 12. The line image forming optical member 1 is provided in such a way as to act upon the beams only in the direction of arrow Y, namely, in the direction normal to a plane surface including the collimated (parallel) beams. With this arrangement, the rotating polygonal mirror 3 will allow the beams to be focused in the Y direction on the reflecting face 33.

It should be noted here that the reflecting face 33 and the surface to be scanned 11 satisfy a ray optical conjugate relationship with respect to a direction normal to the scan direction.

The scanning lens system 4 which performs beam scanning on the photoreceptor drum which provides the surface to be scanned is composed of three lens elements. An element 41 which is located in the nearest position to the polygonal mirror 3 comprises a spherical lens surface; the center element 42 comprises both a plane surface and an aspheric surface of rotational asymmetry that has the radius of its curvature in a direction normal to the scan direction varied with the position of beam deflection (which element is hereunder referred to as an "aspheric lens"); and an element 43 which is located the farthest from the polygonal mirror 3 is composed of a cylindrical and a plane lens surface (which element is hereunder referred to as a "cylindrical lens").

The scanning lens system 4 under consideration is capable of focusing the parallel beams onto the surface to be scanned 11 as long as the image formation in the main or fast scan direction (as indicated by arrow X) is concerned.

The image forming optical member 1 and the scanning lens system 4 may have specifications that are shown below in Table 1.

TABLE 1

| Surface No. | R | r | d | n |
|---|---|---|---|---|
| (1) | ∞ | 33.4 | 5.0 | 1.609 |
| (2) | ∞ | ∞ | 52.5 | 1.0 |
| (3) | ∞ | ∞ | 27.8 | 1.0 |
| (4) | −223 | −223 | 4.5 | 1.822 |
| (5) | −118 | −118 | 3.3 | 1.564 |
| (6) | ∞ | ∞ | 42.1 | 1.0 |
| (7) | ∞ | ∞ | 17.9 | 1.712 |
| (8) | −153 | −55.6 | 200.6 | 1.0 |
| (9) | ∞ | 61.3 | 5.0 | 1.511 |
| (10) | ∞ | ∞ | 99.8 | 1.0 |
| (11) | ∞ | ∞ | | | a = 3.70 E-6
b = 2.80 E-7
c = 3.00 E-11

In Table 1, surfaces (1) and (2) are the lens surfaces of the line image forming optical member 1, surface (3) is the reflecting face 33 of the polygonal mirror 3, surfaces (4) to (10) are the lens surfaces of the scanning lens system 4, and surface (11) is the surface to be scanned 11.

Further referring to Table 1, R denotes the radius of curvature as measured on the optical axis in the scan direction; r denotes the radius of curvature as measured on the optical axis in a direction normal to the scan direction; d is the space between surface; and n is the refractive index. The shape of surface (8) is given by the following equations (A) and (B), in which the Z coordinate is taken along the optical axis and is positive (+) towards the surface to be scanned 11. The X and Y coordinates are positive (+) in the directions indicated by the respective arrows in FIG. 1. The point of intersection of an individual lens surface and the optical axis is represented by X, Y, Z=0.

$$Z = \sqrt{(Z-R)^2 - X^2} + R + aY^4 + bX^2Y^2 + cX^4Y^2 + d \quad \text{(A)}$$

$$Z = Y^2/r\{1 + \sqrt{1-(Y/r)^2}\} \quad \text{(B)}$$

where a, b and c are constants.

In equation (A), d refers to an asymmetric term as exemplified by the sample points shown below in Table 2. Any other positions that are not shown in Table 2 are given by polynomial approximations.

TABLE 2

| X | Y | | | | |
|---|---|---|---|---|---|
|   | -8 | -4 | 0 | 4 | 8 |
| -65 | 19.2 | 4.8 | 0 | 4.8 | 19.2 |
| -50 | 12.0 | 3.0 | 0 | 3.0 | 12.0 |
| -35 | 4.6 | 1.2 | 0 | 1.2 | 4.6 |
| -20 | 1.8 | 0.4 | 0 | 0.4 | 1.8 |
| 0 | 0 | 0 | 0 | 0 | 0 |
| 20 | -1.9 | -0.5 | 0 | -0.5 | -1.9 |
| 35 | -5.4 | -1.4 | 0 | -1.4 | -5.4 |
| 50 | -11.2 | -2.8 | 0 | -2.8 | -11.2 |
| 65 | -16.0 | -4.0 | 0 | -4.0 | -16.0 |

(X, Y in mm; d in μm)

Figure 2:
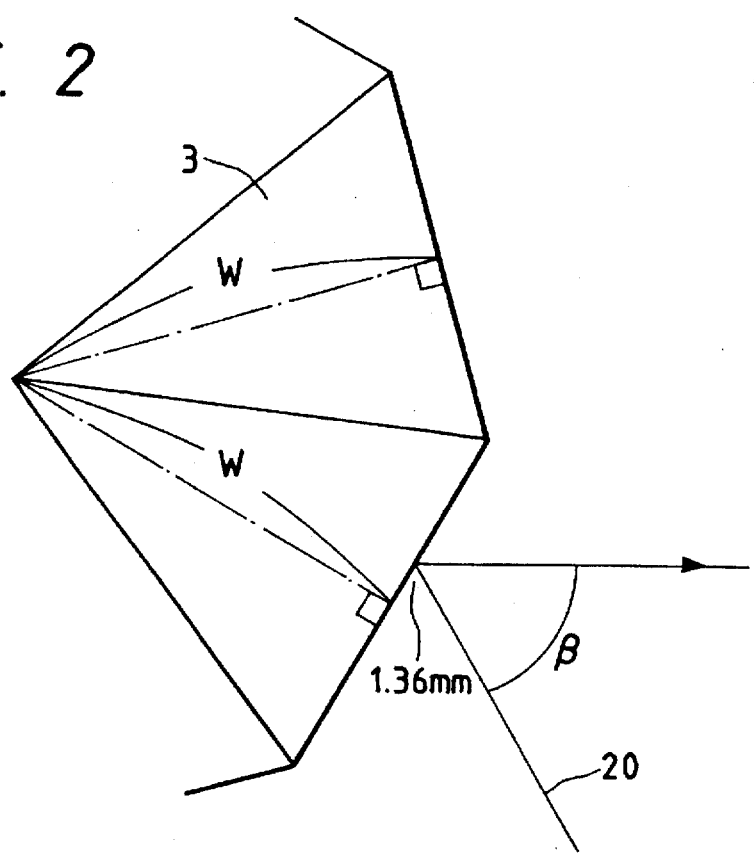
FIG. 2 is a diagram illustrating the rotating polygonal mirror used in the embodiment shown in FIG. 1.

FIG. 2 shows details of the rotating polygonal mirror 3 which is used in the embodiment under discussion. The mirror 3 has eight reflecting faces. The inscribed circle has a radius W of 32.5 mm; the beam incident angle β is 60°; and the positional offset from the center of rotation is 1.36 mm.

The line image forming optical member 1 and the scanning lens system 4 if they are constructed in accordance with the prior art may have the specifications that are shown below in Table 3.

TABLE 3

| Surface No. | R | r | d | n |
|---|---|---|---|---|
| (1) | ∞ | 33.4 | 5.0 | 1.609 |
| (2) | ∞ | ∞ | 52.5 | 1.0 |
| (3) | ∞ | ∞ | 27.8 | 1.0 |
| (4) | -223 | -223 | 4.5 | 1.822 |
| (5) | -118 | -118 | 3.3 | 1.564 |
| (6) | ∞ | ∞ | 42.1 | 1.0 |
| (7) | ∞ | ∞ | 17.9 | 1.712 |
| (8) | -153 | -47.1 | 305.4 | 1.0 |
| (9) | ∞ | ∞ | | |

$n = 1.27\,E\text{-}6$
$b = 3.02\,E\text{-}7$
$c = 0$

The shape of surface (8) is given by the following equations (A) and (B):

$$Z = \sqrt{(Z-R)^2 - X^2} + R + aY^4 + bX^2Y^2 + cX^4Y^2 + d \quad \text{(A)}$$

$$Z = Y^2/r\{1 + \sqrt{1 - (Y/r)^2}\} \quad \text{(B)}$$

where a, b and c are constants. In equation (A), d refers to an asymmetric term as exemplified by the sample points shown below in Table 4. Any other positions that are shown in Table 4 are given by polynomial approximations.

The shape and layout of the rotating polygonal mirror 3 are the same as those Shown in FIG. 2 in connection with the embodiment of the present invention under discussion.

TABLE 4

| x | Y | | | | |
|---|---|---|---|---|---|
|   | -8 | -4 | 0 | 4 | 8 |
| -65 | 5.6 | 1.4 | 0 | 1.4 | 5.6 |
| -50 | 4.9 | 1.2 | 0 | 1.2 | 4.9 |
| -35 | 2.9 | 0.7 | 0 | 0.7 | 2.9 |
| -20 | 1.5 | 0.4 | 0 | 0.4 | 1.5 |
| 0 | 0 | 0 | 0 | 0 | 0 |
| 20 | -1.7 | -0.4 | 0 | -0.4 | -1.7 |
| 35 | -3.3 | -0.8 | 0 | -0.8 | -3.3 |

TABLE 4-continued

| x | Y | | | | |
|---|---|---|---|---|---|
|   | -8 | -4 | 0 | 4 | 8 |
| 50 | -4.7 | -1.2 | 0 | -1.2 | -4.7 |
| 65 | -5.3 | -1.3 | 0 | -1.3 | -5.3 |

(X, Y in mm; d in μm)

Figure 3:
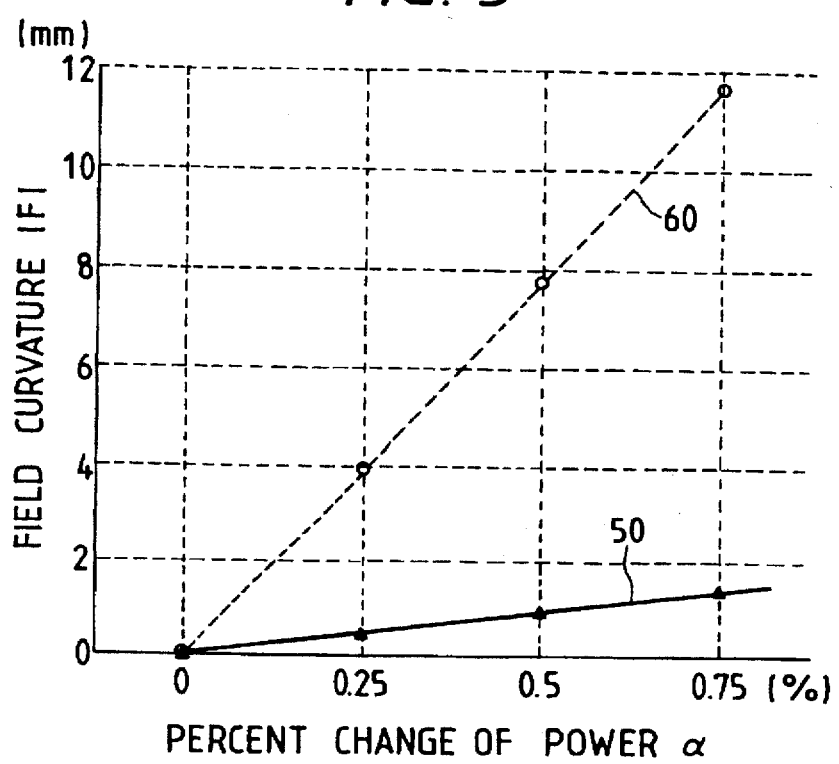
FIG. 3 is a graph showing curvature of the field vs the percent change in power (α) due to errors in the radius of curvature of an aspheric lens in a direction normal to the scan direction.

FIG. 3 plots the absolute values of field curvature F against the percent change of power (α) on account of errors in the radius of curvature of an aspheric lens in a direction normal to the scan direction. In FIG. 3, the solid line indicated by 50 represents the absolute values of the field curvature F according to the embodiment under discussion and the dashed line 60 refers to the absolute values of F in accordance with the prior art. In either case, the absolute value of field curvature increases with the percent change in the power of the aspheric lens; however, the data for the embodiment under consideration are only about one eighth of the data for the prior art.

The lens system that uses a toric lens as a scanning lens has a composite principal near the toric surface and may, hence, be dealt with as an equivalent of the prior art case indicated by line 60.

The function of the laser scanner according to the embodiment having the construction described above is compared below with that of the laser scanner of the prior art construction by specific explanation. In the following description, the scanner in which the scanning lens system 4 is composed of the cylindrical lens 43, the aspheric lens 42, etc. as shown in FIG. 1 is referred to as the type of the embodiment under consideration, whereas the scanner in which the scanning lens system 4 is composed of the lens 44 that includes an aspheric surface of rotational asymmetry which has the curvature radius r in a direction normal to the scan direction varied with the direction of beam deflection as in the prior art but in which the cylindrical lens 43 is not used is referred to as the conventional type.

Figure 4:
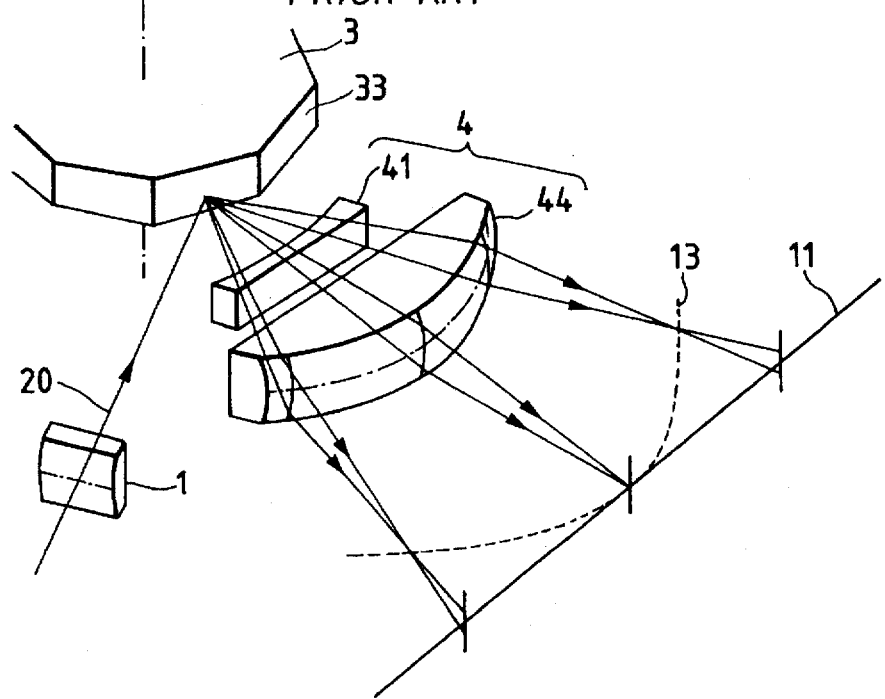
FIG. 4 is a diagram illustrating how curvature of the field develops on account of errors in the radius of curvature of an aspheric surface in a conventional scanning lens system.

In the following description of the conventional type with reference to FIG. 4, the radius of curvature, the surface on which the deflected beams form an a image (which is hereunder referred to as the "image surface") and the curvature of the image surface are all considered with respect to a direction normal to the scan direction. The components that are identified in FIG. 4 by like numerals to those which are shown in FIG. 1 are their equivalents and hence will not be described in detail. Only the components that are identified by unlike numeral will be described below; thus, 13 refers to the image surface in a direction normal to the scan direction, and 44 is an aspheric lens.

The radius of curvature of the aspheric lens 44 is so varied with the position of beam deflection as to produce zero curvature of the field; therefore, in the absence of errors in the radius of curvature, the image surface 13 will coincide completely with the surface to be scanned 11. However, the radius of curvature may occasionally involve an error as in the case where there is no error in the central scanning portion of the aspheric lens 44 but there is a negative error in either end portion of the scanning area (i.e., the radius of curvature is unduly small). In a case like this, the beam 2 passing through the central scanning portion which has a predetermined radius of curvature will be focused correctly to form image on the surface to be scanned 11.

On the other hand, both end portions of the scan area of the aspheric lens 44 have a smaller radius of curvature than a predetermined value and, hence, they provide an excessive power that causes the passing beam 20 to be focused short of the surface to be scanned 11. As a result, the image surface 13 will be curved.

Thus, the scanner in which an aspheric lens of rotational asymmetry that has the radius of curvature in a direction normal to the scan direction varied with the position of beam deflection is used as a scanning lens will produce curvature of the field on account of errors in the radius of curvature of the aspheric surface in a direction normal to the scan direction.

Figure 5:
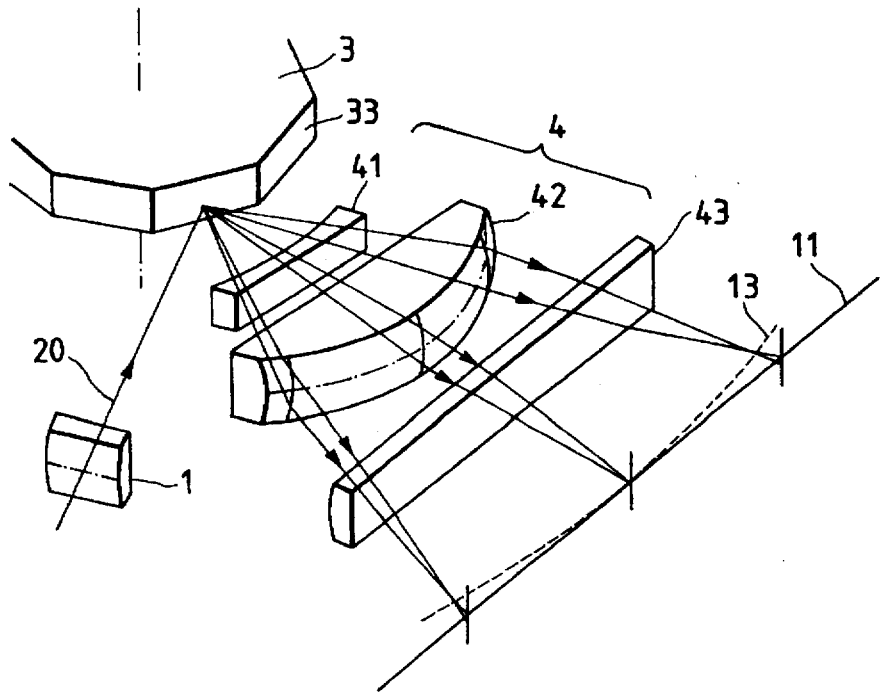
FIG. 5 is a diagram illustrating how curvature of the field develops on account of errors in the radius of curvature of an aspheric surface in the scanning lens system used in the embodiment shown in FIG. 1.

In contrast, the type of the embodiment under consideration which is shown in FIG. 5 is composed of the aspheric lens 42, the cylindrical lens 43 having a positive power, etc. The components that are identified in FIG. 5 by like numerals to those which are shown in FIG. 1 are their equivalents and hence will not be described in detail. Only the component that is identified by unlike numeral will be described below; thus, 13 refers to the image surface in a direction normal to the scan direction.

The radius of curvature of the aspheric lens 42 is so varied with the position of beam deflection as to produce zero curvature of the field including the effect of the cylindrical lens 43; therefore, in the absence of errors in the radius of curvature, the image surface 13 will coincide completely with the surface to be scanned 11.

If there is an error in the radius of curvature, the image surface 13 will be curved but, as already mentioned, the scanning lens system 4 according to the present invention is composed of the cylindrical lens 43, aspheric lens 42, etc. and this construction effectively reduces the field curvature due to errors in the curvature radius of the aspheric lens in a direction normal to the scan direction.

Figure 6:
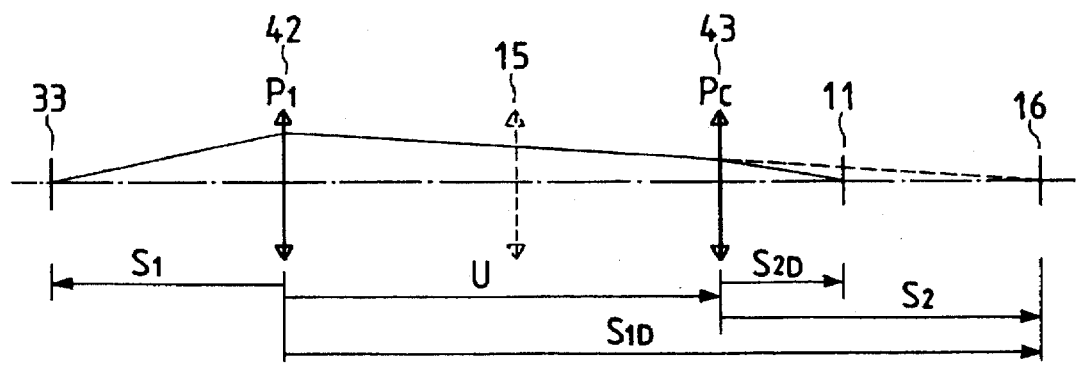
FIG. 6 is a diagram showing how image is formed in a direction normal to the scan direction by the scanning lens system used in the embodiment shown in FIG. 1.
Figure 7:
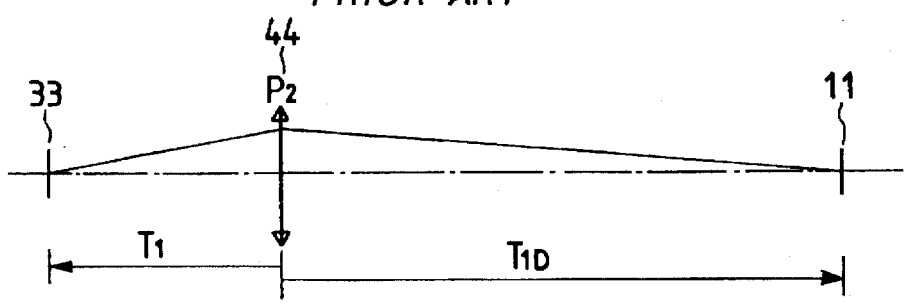
FIG. 7 is a diagram showing how image is formed in a direction normal to the scan direction by the conventional scanning lens system.

FIG. 6 illustrates how image is formed in a direction normal to the scan direction by the type of the embodiment under consideration. FIG. 7 illustrates how image is formed in a direction normal to the scan direction by the conventional type.

Referring to FIG. 6, numeral 15 denotes a plane that passes through the composite principal point of the aspheric lens 42 and the cylindrical lens 43 and which is normal to the optical axis, and 16 denotes a plane that passes through the point of intersection of the optical axis and the beam as refracted by the aspheric lens 42 and which is normal to the optical axis.

For the sake of simplicity, the distance between the principal point on the object side and that on the image side is neglected in the following discussion and a single principal point is substituted.

The aspheric lenses 42 and 44 are assumed to have powers $P_1$ and $P_2$, respectively, in a direction normal to the scan direction and they are also assumed to be located in the same positions in both the type of the embodiment under consideration and the conventional type. The power of the cylindrical lens 43 in a direction normal to the scan direction is written as $P_C$. In both types, an optical conjugate relationship holds with the object point lying at the reflecting surface 33 of the polygonal mirror 3 and the image point at the surface to be scanned 11.

The relations for image formation can be expressed by equations (1) to (3) set forth below, wherein $S_1$ represents the position of the reflecting surface 33 of the polygonal mirror 3 with reference to the aspheric lens 42, $S_{1D}$ the position of the plane 16 (which passes through the point of intersection of the optical axis and the beam as refracted by the aspheric lens 42 and which is normal to the optical axis) with reference to the aspheric lens 42, $S_2$ the position of the same plane 16 with reference to the cylindrical lens 43, $S_{2D}$ the position of the surface to be scanned 11 with reference to the cylindrical lens 43, $T_1$ the position of the reflecting face 33 of the polygonal mirror 3 with reference to the aspheric lens 44, $T_{1D}$ the position of the surface to be scanned 11 with reference to the aspheric lens 44, and U the position of the cylindrical lens 43 with reference to the aspheric lens 42. The effect of the spherical lens 41 is so small that it can safely be disregarded.

$$1/S_{1D} = 1/S_1 + P_1 \quad (1)$$

$$1/S_{2D} = 1/S_2 + P_C \quad (2)$$

$$1/T_{1D} = 1/T_1 + P_2 \quad (3)$$

The values of the respective symbols in equations (1) to (3) satisfy the following relations (4) to (8):

$$P_2 > P_1, P_C > 0 \quad (4)$$

$$S_1 = T_1 < 0 \quad (5)$$

$$T_{1D} = S_{2D} + U > 0 \quad (6)$$

$$S_{2D}, T_{1D}, U > 0 \quad (7)$$

$$S_{1D} = S_2 + U \quad (8)$$

From equation (2) and relation (4), relation (9) is derived, which can be rewritten as relation (10):

$$1/S_{2D} > 1/S_2 \quad (9)$$

$$S_2 > S_{2D} \quad (10)$$

From relations (6), (8) and (10), equation (11) is derived:

$$T_{1D} - S_{1D} = S_{2D} - S_2 < 0 \quad (11)$$

Let us see how the positions of planes that are optically conjugate to the surface to be scanned 11 (at which the image point lies) vary if the powers $P_1$ and $P_2$ of the aspheric lenses 42 and 44 both vary by the percent factor α on account of errors in the radius of curvature in a direction normal to the scan direction. If the radius of curvature has a negative error, the percent change in power (α) assumes a positive value.

Figure 8:
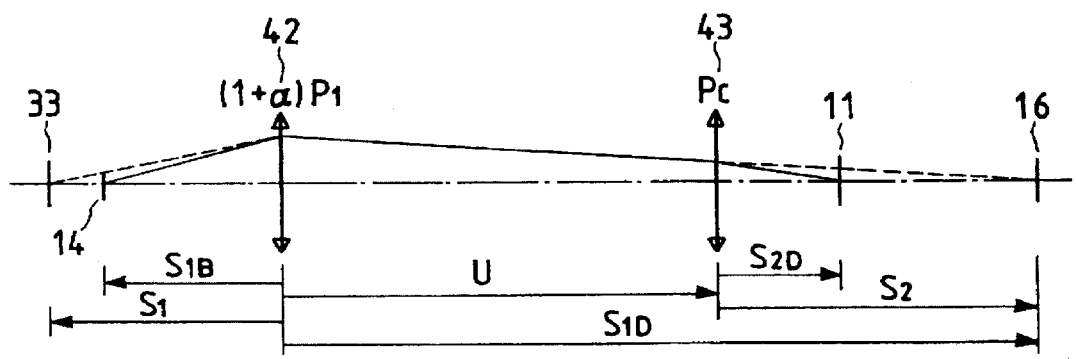
FIG. 8 is a diagram showing how image is formed in a direction normal to the scan direction by the scanning lens system in the embodiment shown in FIG. 1 for the case where the radius of its curvature involves an error.
Figure 9:
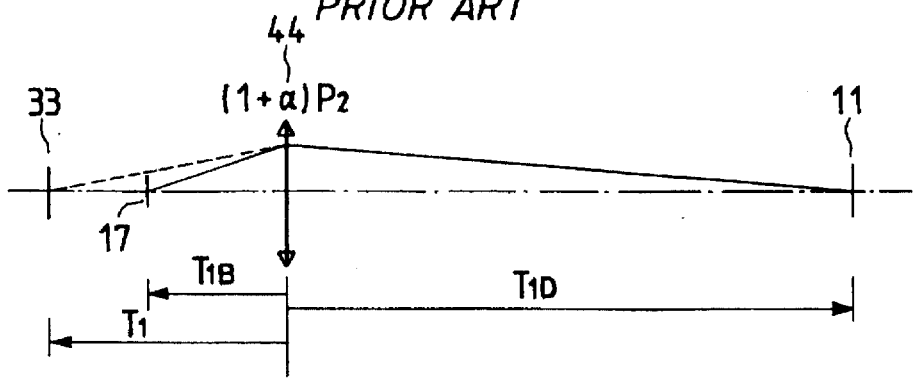
FIG. 9 is a diagram showing how image is formed in a direction normal to the scan direction by the conventional scanning lens system for the case where the radius of its curvature involves an error.

FIG. 8 illustrates how image is formed in a direction normal to the scan direction by the type of the embodiment under consideration if there is an error in the radius of curvature. FIG. 9 illustrates how image is formed in a direction normal to the scan direction by the conventional type in the presence of an error in the radius of curvature.

Referring to FIGS. 8 and 9, numerals 14 and 17 denote planes that are optically conjugate to the surface to be scanned 11 in the respective types. Let the position of the conjugate plane 14 with reference to the aspheric lens 42 after a change in $P_1$ be written as $P_{1B}$ and the position of the conjugate plane 17 with reference to the aspheric lens 44 after a change in $P_2$ as $T_{1B}$. Then, equations (12) and (14) will hold. By substituting equations (1) and (3), equations (12) and (14) can be rewritten as equations (13) and (15), respectively:

$$1/S_{1B} = 1/S_{1D} - (1 + α)P_1 \quad (12)$$

-continued $$= 1/S_1 - \alpha P_1 \quad (13)$$

$$1/T_{1B} = 1/T_{1D} - (1+\alpha)P_2 \quad (14)$$

$$= 1/T_1 - \alpha P_2 \quad (15)$$

From equations (5), (13) and (15), we obtain equation (16), which can be rewritten as relation (17):

$$1/T_{1B} - 1/S_{1B} = \alpha(P_1 - P_2) < 0 \quad (16)$$

$$T_{1B} > S_{1B} \quad (17)$$

From relation (4) and equation (13), we obtain relation (18), which can be rewritten as relation (19):

$$1/S_{1B} < 1/S_1 \quad (18)$$

$$S_{1B} > S_1 \quad (19)$$

From relation (4) and equation (15), we obtain relation (20), which can be rewritten as relation (21):

$$1/T_{1B} < 1/T_1 \quad (20)$$

$$T_{1B} > T_1 \quad (21)$$

As one can see from relations (19) and (21), the positions of the planes 14 and 17 which are each optically conjugate to the surface to be scanned 11 (where the image point lies) will approach the aspheric lenses 42 and 44, respectively, as the powers of these lenses increase in a direction normal to the scan direction.

One can also see from relation (17) that the positional change is smaller in the type of the embodiment under consideration than in the conventional type.

We next make comparison of the longitudinal magnification. By definition, the longitudinal magnification M is given by the following formula (22):

$$M = (L_2/L_1)^2 \quad (22)$$

where $L_1$ is the distance between the object point and the principal point, and $L_2$ is the distance between the principal point and the image point.

If the longitudinal magnification of the conventional type is written as MT, the following equations (23) to (25) will hold since the composite principal point of the lens system is near the aspheric surface:

$$L_2 = T_{1D} \quad (23)$$

$$L_1 = -T_1 \quad (24)$$

$$M_T = (T_{1D}/-T_1)^2 \quad (25)$$

If the longitudinal magnification of the type of the embodiment under consideration is written as $M_S$, the following relations (26) to (28) will hold since the composite principal point 15 of the lens system lies between the aspheric lens 42 and the cylindrical lens 43 as shown in FIG. 6:

$$L_2 < T_{1D} \quad (26)$$

$$L_1 > -T_1 \quad (27)$$

$$M_S < (T_{1D}/-T_1)^2 \quad (28)$$

From relations (25) and (28), the following relation (29) is derived:

$$M_T > M_S \quad (29)$$

Finally, let us make a comparison between each curvature of field, that is caused by the relative offset of the above-determined optically conjugate planes 14 to 17 from the reflecting surface 33 of the polygonal mirror 3 in the conventional type of the optical system and in the embodiment of the optical system under consideration, respectively.

If the field curvature is written as F and the amount of change in the position of conjugate plane 14 or 17 as $\Delta$, then the relation expressed by equation (30) will hold, with f<0 referring to the case where the image point is offset towards the cylindrical lens 43:

$$f = -\Delta \cdot M \quad (30)$$

Figure 10:
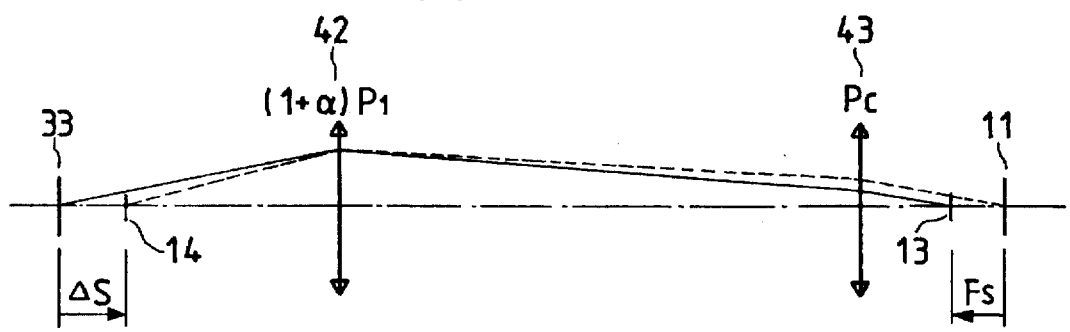
FIG. 10 is a diagram showing how curvature of the field develops in the scanning lens system used in the embodiment shown in FIG. 1.

FIG. 10 illustrates how the image surface is curved in the type of the embodiment under consideration. If the amount of change in the position of conjugate plane 14 is written as $\Delta S$ and the curvature of the image surface as $F_S$, the following equations (31) and (32) will hold:

$$\Delta S = S_{1B} - S_1 \quad (31)$$

$$F_S = -\Delta S \cdot M_S \quad (32)$$

Figure 11:
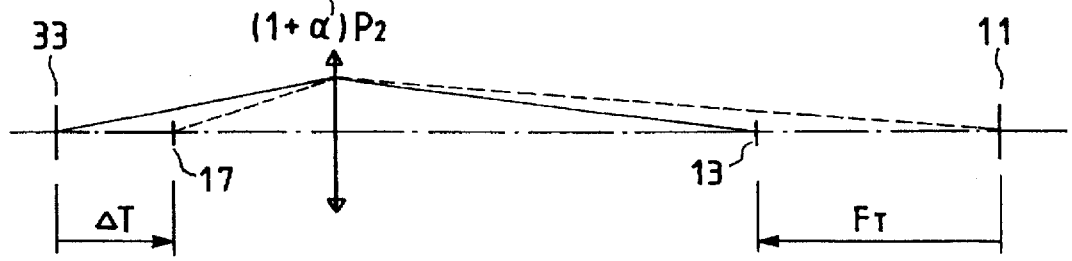
FIG. 11 is a diagram showing how curvature of the field develops in the conventional scanning lens system.

FIG. 11 illustrates how the image surface is curved in the conventional type. If the amount of change in the position of conjugate plane 17 is written as $\Delta T$ and the curvature of the image surface as $F_T$, the following equations (33) and (34) will hold:

$$\Delta T = T_{1B} - T_1 \quad (33)$$

$$F_T = -\Delta T \cdot M_T \quad (34)$$

From relations (5), (17), (31) and (33), we obtain relation (35):

$$\Delta T > \Delta S \quad (35)$$

From relations (29), (32), (34) and (35), we obtain relation (36):

$$F_T < F_S \quad (36)$$

Both $F_T$ and $F_S$ are of negative value, so compared with the scanning lens system 4 that comprises the aspheric lens 44, etc. but which does not use the cylindrical lens 43, the scanning lens system 4 that is composed of the aspheric lens 42, cylindrical lens 43, etc. is advantageous in that the absolute value of field curvature due to an error in the radius of curvature of the aspheric lens 42 in a direction normal to the scan direction is smaller than the absolute value of field curvature due to an error in the curvature radius of the aspheric lens 44.

As described on the foregoing pages, the scanning lens system of the present invention is composed of a plurality of lenses, among which the one that is the closest to the surface to be scanned is a cylindrical lens having a positive power and in which another lens surface is so adapted that the radius of its curvature in a direction normal to the scan direction increases monotonically from the central portion to either end portion. As a result, the curvature of the image field that occurs on account of the scanning lens system is sufficiently reduced to provide a small spot of stable laser beam over the whole scan range. Hence, the present invention has the advantage of offering a laser scanner for use in a laser printer system for high-resolution printing, as well as a scanning lens system to be used with such laser scanner.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A laser scanner, comprising:

a laser light source for generating a laser beam;

a line image forming optical member;

a light deflector with a reflecting face which receives said laser beam from said laser light source through said line image forming optical member to form a line image on said reflecting face;

a scanning lens system which focuses a reflecting laser beam from said reflecting face of said light deflector to scan over a surface to be scanned, comprising an aspheric lens at least one surface of which has a radius of curvature in a direction normal to the scan direction which increases from the central portion to either end portion;

a cylindrical lens having a positive power and which is located in the nearest position to said surface to be scanned; and the curvature of said aspheric lens is defined so that said reflecting face of said light deflector and said surface to be scanned have a conjugate focussing relationship in a state where said cylindrical lens is arranged at said position, and the curvature of image field is corrected by said cylindrical lens on the basis of an error in machining of the curvature of said aspheric lens.

* * * * *